(12) United States Patent
Iwasa et al.

(10) Patent No.: US 9,077,837 B2
(45) Date of Patent: Jul. 7, 2015

(54) IMAGE PROCESSING APPARATUS

(71) Applicants: Keisuke Iwasa, Kanagawa (JP); Yoh Masuyama, Kanagawa (JP); Tadashi Nagata, Kanagawa (JP)

(72) Inventors: Keisuke Iwasa, Kanagawa (JP); Yoh Masuyama, Kanagawa (JP); Tadashi Nagata, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/165,890

(22) Filed: Jan. 28, 2014

(65) Prior Publication Data

US 2014/0226185 A1     Aug. 14, 2014

(30) Foreign Application Priority Data

Feb. 13, 2013 (JP) .................................. 2013-025155

(51) Int. Cl.
*H04N 1/21* (2006.01)
*H04N 1/00* (2006.01)
*G06K 15/00* (2006.01)

(52) U.S. Cl.
CPC ............ *H04N 1/0083* (2013.01); *G06K 15/401* (2013.01); *G06K 15/4025* (2013.01); *H04N 1/21* (2013.01)

(58) Field of Classification Search
CPC ............ G06K 15/401; G06K 15/4025; H04N 1/0083; H04N 1/21

USPC .................................. 358/1.1–1.9, 1.11–1.18
See application file for complete search history.

(56) References Cited

U.S. PATENT DOCUMENTS

| 8,125,673 | B2 | 2/2012 | Nagasawa |
| 8,800,008 | B2* | 8/2014 | Sturtevant et al. ................. 726/6 |
| 2009/0234979 | A1* | 9/2009 | Hamasaki ....................... 710/16 |
| 2011/0228297 | A1 | 9/2011 | Omori |

FOREIGN PATENT DOCUMENTS

| JP | 2003-259044 | 9/2003 |
| JP | 4135735 | 8/2008 |
| JP | 2006-236541 | 10/2008 |
| JP | 2008-306279 | 12/2008 |
| JP | 2009-303070 | 12/2009 |
| JP | 2011-193397 | 9/2011 |

* cited by examiner

*Primary Examiner* — King Poon
*Assistant Examiner* — Ibrahim Siddo
(74) *Attorney, Agent, or Firm* — IPUSA, PLLC

(57) ABSTRACT

An image processing apparatus includes an operations unit configured to be directly operated by a user; a main unit configured to operate based on a request from the operations unit; a determination unit configured to determine a device that is to use an external storage device of the operations unit, in accordance with one of a function of the main unit that is activated through the operations unit and an application of the operations unit; and a switching unit configured to switch a current connection of the external storage device to a connection between the determined device and the external storage device.

8 Claims, 5 Drawing Sheets

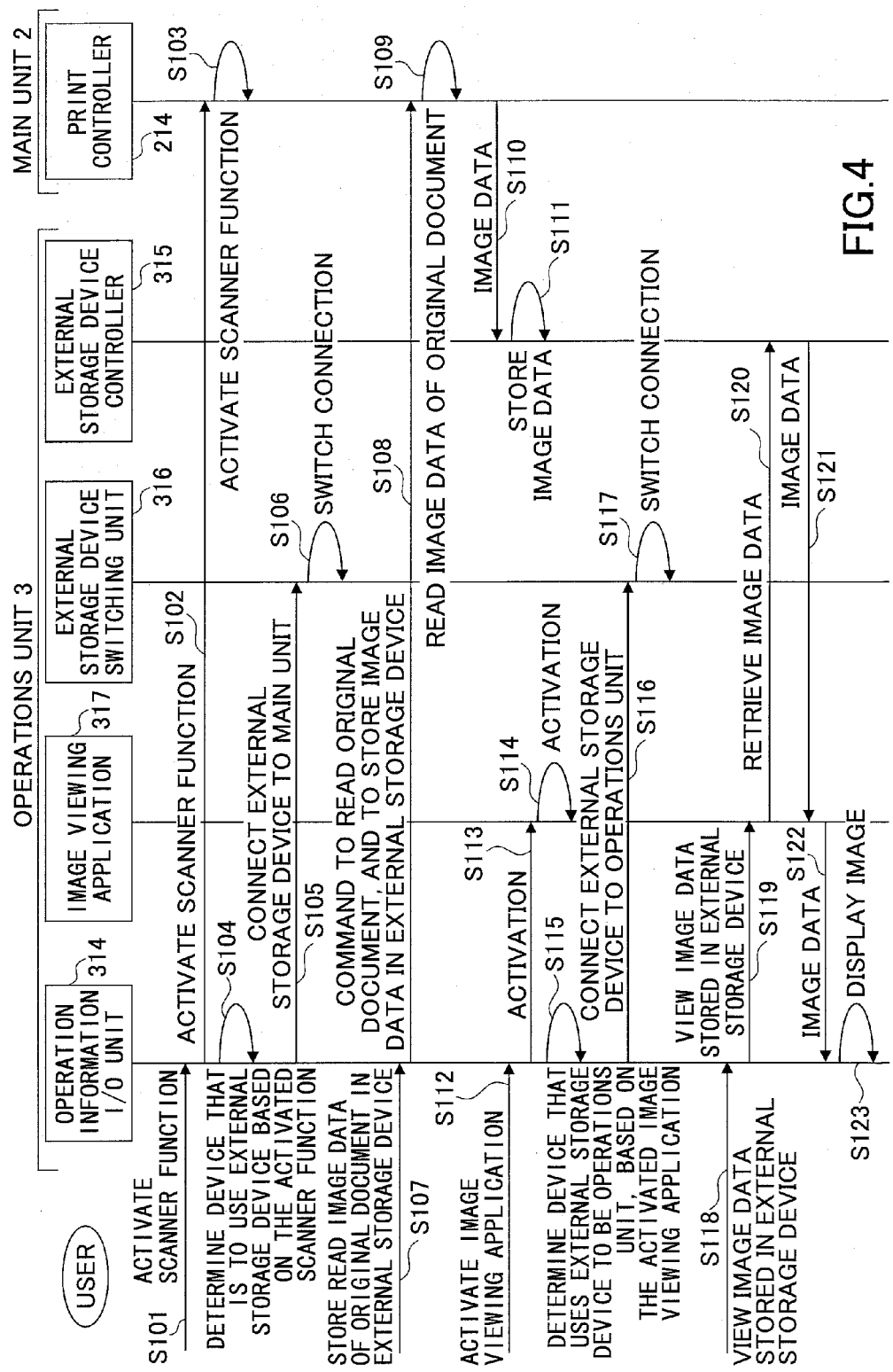

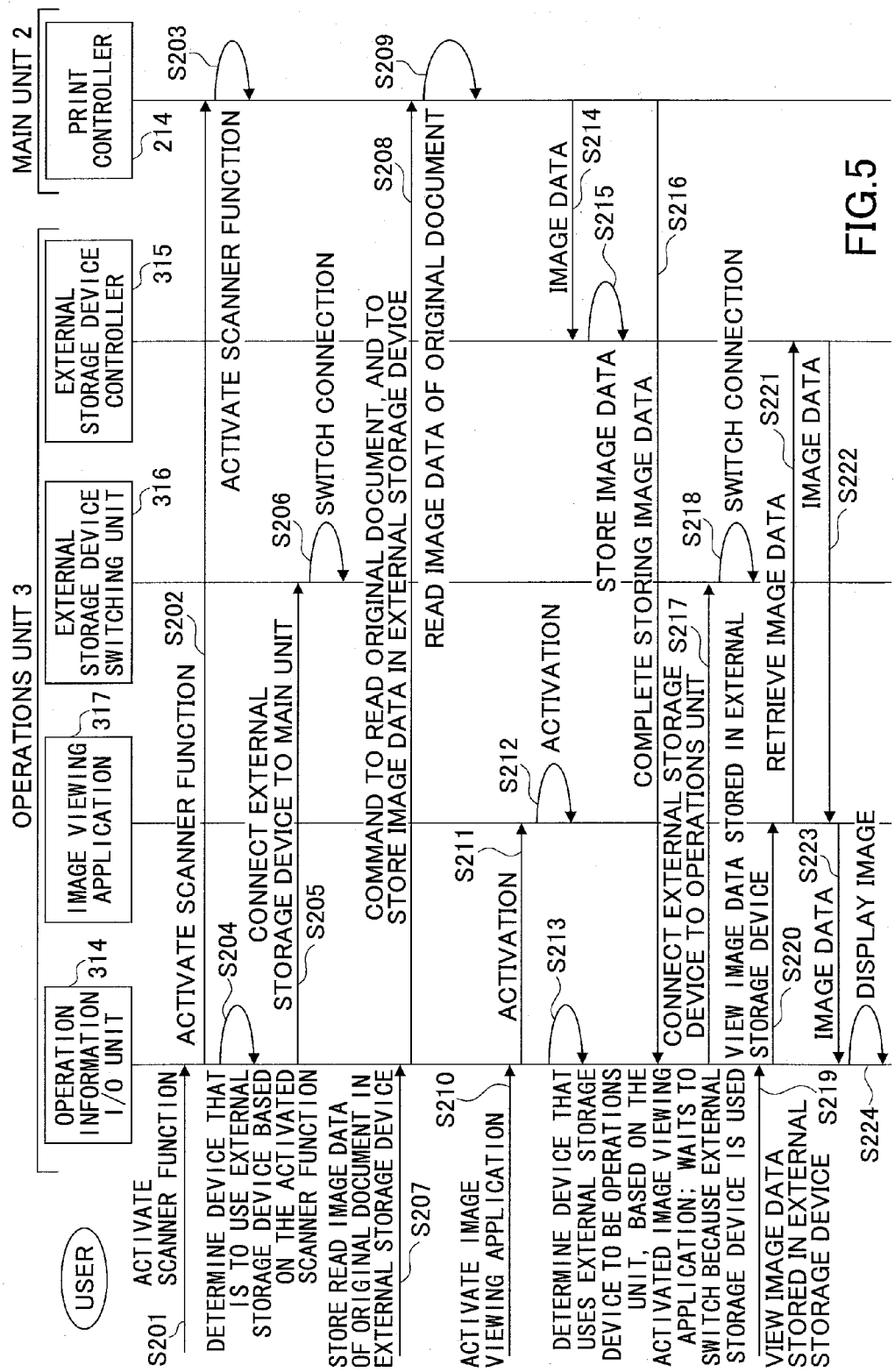

IMAGE PROCESSING APPARATUS

BACKGROUND OF THE INVENTION

1. Field of the Invention

The present invention relates to a control technique of an image processing apparatus.

2. Description of the Related Art

A multi function peripheral and a multi function printer (MFP) are examples of an image processing apparatus. In general, an image processing apparatus includes a main unit and an operations unit. The operations unit is a unit with which a user can operate the image processing apparatus. For example, an operations unit may include a display that displays an operations screen, and a key pad for key input operation. For such an image processing apparatus, a configuration may be considered such that an operations unit is separated from a main unit. With such a configuration, even if the processing load of the main unit is heavy, the latency of a response to an input operation can be avoided. In the operations unit, an independent operating system (OS), such as the Android OS, is installed. The operations unit can operate independently from the main unit.

In order to facilitate transferability of image data or a program, the operations unit is provided with a slot for a memory card or the like. With such a configuration, a memory card or the like, as an external storage device, may be detachably attached to the operations unit.

A device (e.g., the main unit or the operations unit) that uses the external storage device may depend on usage of the external storage device.

Examples of the use for which the main unit uses the external storage device may include the following:
  to print out a file stored in the external storage device;
  to store a scanned image in the external storage device;
  to store a result of self-diagnosis by the main unit; and
  to update an application of the main unit by using the external storage unit.

Examples of the use for which the operations unit uses the external storage device may include the following:
  to store an image edited by the operations unit in the external storage device;
  to update an application of the operations unit by using the external storage device;
  to store a mail received by the operations unit in the external storage device;
  to view an image file stored in the external storage device by using the operations unit; and
  to store a log of operation of the operations unit in the external storage device.

An OS executed by the main unit may be different from an OS executed by the operations unit. It may not be efficient to provide a file sharing function or the like for such an embedded system. Accordingly, for each time the external storage device is used, connection to (or mounting of) the external storage device may be switched for a device (e.g., the main unit or the operations unit) that uses the external device.

Patent Document 1 (Japanese Patent No. 4135735) discloses a method of switching an operation mode of an image processing apparatus. According to the disclosed method, upon insertion of a medium, a state of an original document is detected and a determination is made as to whether a file is stored in the medium, and an operation mode of the image processing apparatus is switched to a scanning mode or a print mode. In this manner, an attempt has been made to improve operability of the image processing apparatus.

SUMMARY OF THE INVENTION

According to an aspect of the present invention, there is provided an image processing apparatus including an operations unit configured to be directly operated by a user; a main unit configured to operate based on a request from the operations unit; a determination unit configured to determine a device that is to use an external storage device of the operations unit, in accordance with one of a function of the main unit that is activated through the operations unit and an application of the operations unit; and a switching unit configured to switch a current connection of the external storage device to a connection between the determined device and the external storage device.

According to another aspect of the present invention, there is provided an image processing system including an image processing apparatus that includes an operations unit configured to be directly operated by a user, and a main unit configured to operate based on a request from the operations unit; a determination unit configured to determine a device that is to use an external storage device of the operations unit, in accordance with one of a function of the main unit that is activated through the operations unit and an application of the operations unit; and a switching unit configured to switch a current connection of the external storage device to a connection between the determined device and the external storage device.

According to another aspect of the present invention, there is provided a non-transitory computer readable recording medium storing an image processing program, the image processing program causes a computer being a controller of an image processing apparatus including an operations unit configured to be directly operated by a user, and a main unit configured to operate based on a request from the operations unit to operate as a determination unit configured to determine a device that is to use an external storage device of the operations unit in accordance with one of a function of the main unit that is activated through the operations unit and an application of the operations unit; and a switching unit configured to switch a current connection of the external storage device to a connection between the determined device and the external storage device.

Other objects, features and advantages of the present invention will become more apparent from the following detailed description when read in conjunction with the accompanying drawings.

BRIEF DESCRIPTION OF THE DRAWINGS

FIG. 4 is a sequence diagram showing an example of processing according to the embodiment; and FIG. 5 is a sequence diagram showing another example of the processing according to the embodiment.

DETAILED DESCRIPTION OF THE PREFERRED EMBODIMENTS

Under the existing circumstances, depending on whether the external storage device of the operations unit is to be used by the main unit or by the operations unit, a device that is to use the external storage device is manually switched. Each time a device that is to use the external storage device is to be switched, a user may be required to open a setting screen so as to perform switching operation to switch the device. Namely, there is a need to improve operability.

Unfortunately, the method disclosed in Patent Document 1 is not for an image processing apparatus such that a main unit and an operations unit are separated. Accordingly, the method may not be applied to such an image processing apparatus for improving the operability of switching a device that is to use the external storage device.

There is a need for improving the operability of switching a device that is to use the external storage device. It is desirable that a user may not be required to open a setting screen and manually switch a device, when the device that uses the external device is to be switched.

According to an embodiment of the present invention, when a device that uses the external device is to be switched, a user may not be required to open a setting screen and manually switch a device. Accordingly, operability may be improved.

Hereinafter, the embodiment of the present invention is explained.

<Configuration>

Figure 1:
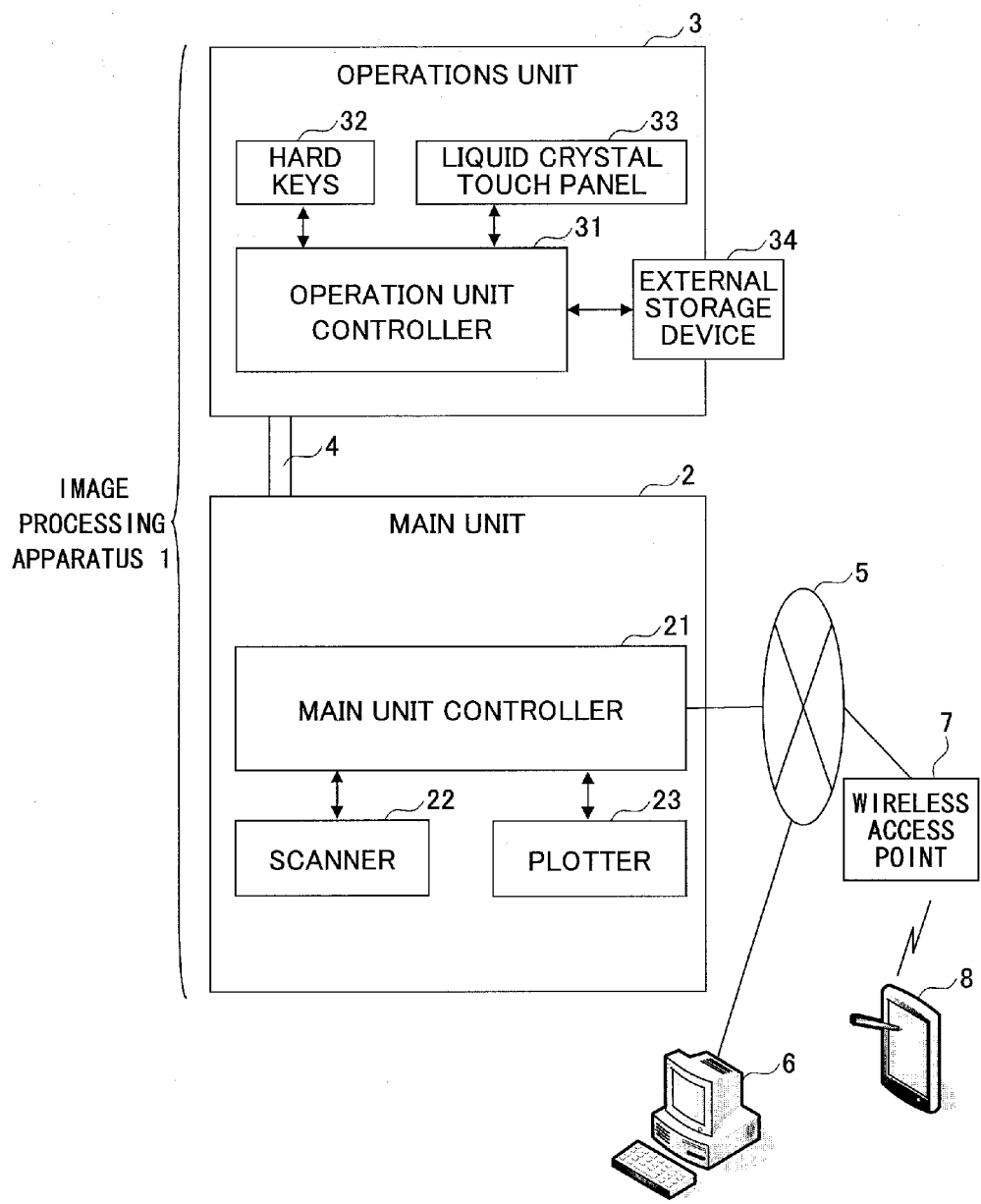
FIG. 1 is a diagram showing an example of a configuration of an image processing apparatus according to an embodiment of the present invention.

FIG. 1 is a diagram showing an example of a configuration of an image processing apparatus 1 according to the embodiment of the present invention.

Referring to FIG. 1, the image processing apparatus 1 includes a main unit 2; and an operations unit 3. The operations unit 3 is connected to the main unit 2 through a cable 4. Here, instead of the wired connection by the cable 4, the main unit 2 and the operations unit 3 may be wirelessly connected (which includes connection based on infrared technology).

The main unit includes a main unit controller 21; a scanner 22; and a plotter 23. The main unit controller 21 controls operations of the main unit 2. The scanner 22 can read an original document. The plotter 23 can print an image on a sheet.

The main unit 2 can be accessed from a terminal device 6 (e.g., a personal computer (PC)) through a network 5 (e.g., a local area network (LAN), a wide area network (WAN), or the Internet). The main unit 2 can also be accessed from a terminal device 8 (e.g., a smart phone, or a tablet computer) through a wireless access point 7. The main unit 2 may be directly accessed by the terminal device 8 by using short range radio communication (e.g., communication based on Bluetooth (registered trade mark)).

The operations unit 3 includes an operations unit controller 31; hard keys 32; a liquid crystal touch panel 33; and an external storage device 34. The operations unit controller 31 controls operations of the operations unit 3. The hard keys 32 can be operated by a user. The liquid crystal touch panel 33 can display a screen. The liquid crystal touch panel 33 can receive an operation input. The external storage device 34 can be detachably attached to the operations unit 3. For example, the external storage device 34 may be a memory card.

Figure 2:
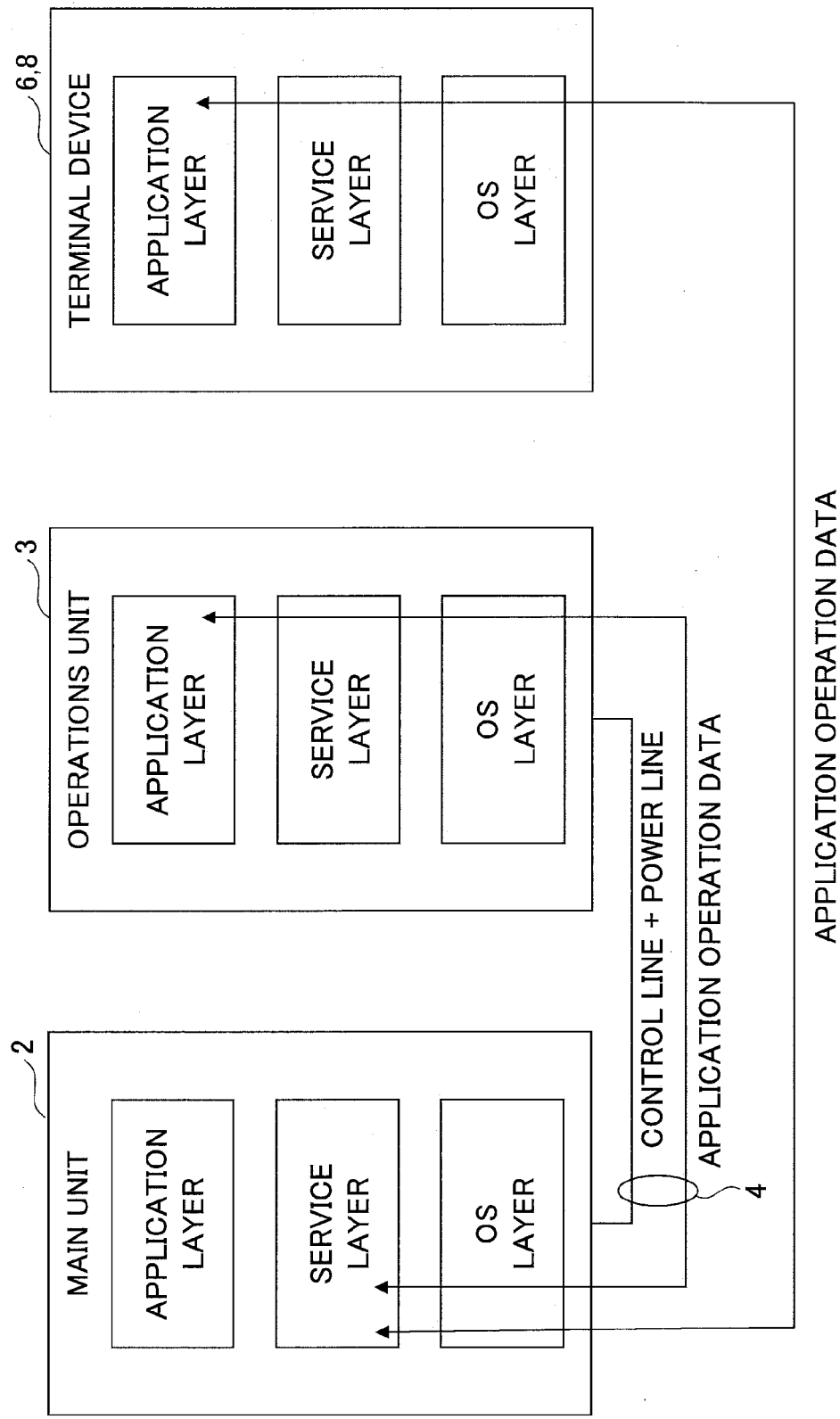
FIG. 2 is a diagram showing an example of a flow of application operation data, when an operations unit or an application of a terminal device utilizes a function of a main unit.

FIG. 2 is a diagram showing an example of a flow of application operation data, when the operation unit 3 or an application of the terminal 6 or the terminal 8 utilizes a function of the main unit 2.

As shown in FIG. 2, the cable 4 may include a control line and a power line. The control line and the power line may be extended from the main unit 2, and the control line and the power line may be connected to the operations unit 3. Application operation data from an application layer of the operations unit 3 can be transmitted to a service layer of the main unit 2 through the cable 4. Application operation data from an application layer of the terminal device 6 can be transmitted to the service layer of the main unit 2 through the network 5. Similarly, application operation data from an application layer of the terminal device 8 can be transmitted to the service layer of the main unit 2 through the network 5.

Figure 3:
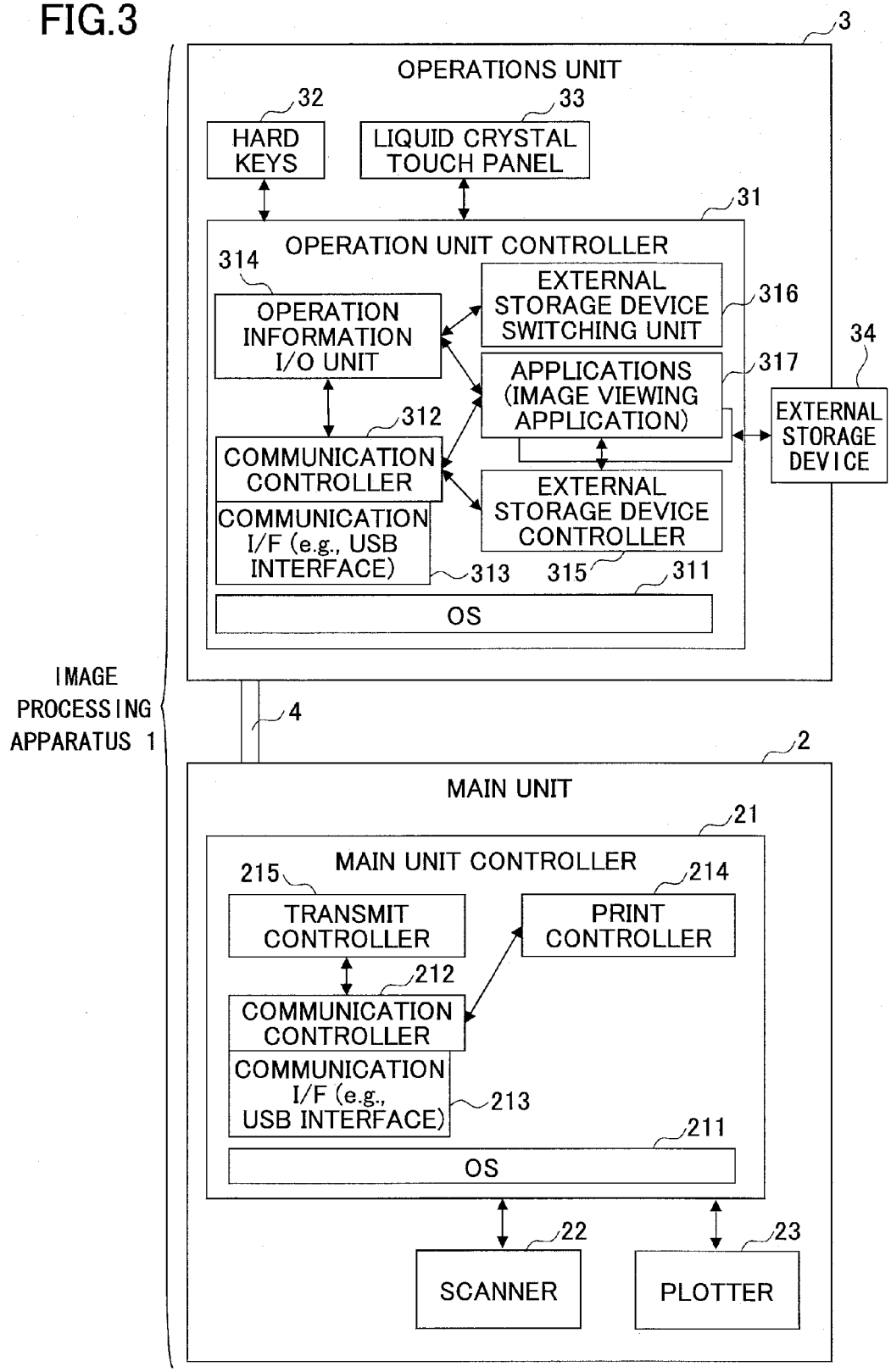
FIG. 3 is a diagram showing an example of a configuration of a main unit controller and an example of a configuration of an operations unit controller.

FIG. 3 is a diagram showing an example of a configuration of the main unit controller 21 and an example of a configuration of the operations unit controller 31.

As shown in FIG. 3, the main unit controller 21 of the main unit 2 includes an operating system (OS) 211; a communication controller 212; a communication interface 213; a print controller 214; and a transmit controller 215.

The OS 211 is system software of the main unit controller 21.

The communication controller 212 may control data communication with the operations unit 3, the terminal 6, or the terminal 8 (cf. FIG. 1) through the communication interface 213. The communication interface 213 may be a communication device, such as a communication device for a universal serial bus (USB) based communication, serial communication, wired communication, a wireless LAN based communication, Bluetooth based communication, or Infrared Data Association (IrDA) based communication, for example. The communication controller 212 can forward data received from an external device to the print controller 214 and/or to the transmit controller 215. The communication controller 212 can transmit data received from the print controller 214 and/or the transmit controller 215 to an external device.

The print controller 214 controls the scanner 22 and the plotter 23, for example. The print controller 214 can control execution of a print job.

The transmit controller 215 can control execution of a transmit job, such as mail transmission, or folder transfer.

The operations unit controller 31 of the operations unit 3 includes an OS 311; a communication controller 312; a communication interface 313; an operation information input/output unit 314; an external storage device controller 315; an external storage device switching unit 316; and various types of applications 317.

The OS 311 is system software of the operations unit controller 31.

The communication controller 312 can control data communication with the main unit 2 through the communication interface 313. The communication interface 313 may be a communication device, such as a communication device for a universal serial bus (USB) based communication, serial communication, wired communication, a wireless LAN based communication, Bluetooth based communication, or Infrared Data Association (IrDA) based communication, for example. The communication controller 312 can forward data received from an external device to the operation information input/output unit 314, the external storage device controller 315, the external storage device switching unit 316, and/or the various types of applications 317. The communication controller 312 can transmit data received from the operation information input/output unit 314, the external storage device controller 315, the external storage device switching unit 316, and/or the various types of applications 317 to an external device.

The operation information input/output unit 314 can display a screen to a user by using the liquid crystal touch panel 33. The operation information input/output unit 314 can receive user operation through the hard keys 32, or through the liquid crystal touch panel 33. The operation information input/output unit 314 stores correspondence between functions of the main unit 2 and devices that use the external storage device 34. The operation information input/output unit 314 stores correspondence between applications of the operations unit 3 and devices that user the external storage device 34. The operation information input/output unit 314 can determine a device that is to use the external storage device 34, depending on a function of the main unit 2 activated by the operations unit 3, or an application of the operation unit 3.

The external storage device controller 315 can detect insertion (attachment) of the external storage device 34, and detachment of the external storage device 34. The external storage device controller 315 can read out data stored in the external storage device 34. The external storage device controller 315 can write data into the external storage device 34.

The external storage device switching unit 316 can switch a device that is to use the external storage device 34. For example, when the external storage device 34 is mounted to (i.e., connected to) the operations unit 3, and when the main unit 2 is to use the external storage device 34, the external storage device switching unit 316 releases the mounting to (i.e., the connection to) the operations unit 3, and subsequently the external storage device switching unit 316 mounts (i.e., connects) the external storage device 34 as a storage unit of the main unit 2 through USB-based connection, for example. Here, mounting makes the external storage device 34 available for use. As another example, when the external storage device 34 is mounted to (i.e., connected to) the main unit 2, and when the operations unit 3 is to use the external storage device 34, the external storage device switching unit 316 releases the mounting to (i.e., the connection to) the main unit 2, and subsequently the external storage device switching unit 316 mounts (i.e., connects) the external storage device 34 to the operations unit 3.

The applications 317 may be application programs, such as an application program for viewing an image that can be executed on the side of the operations unit 3.

Here, functions included in the main unit 2 are not necessarily installed in the main unit 2. Similarly, functions included in the operations unit 3 are not necessarily installed in the operations unit 3. For example, such functions can be provided as functions that are available on a network.

<Operation>

FIG. 4 is a sequence diagram showing an example of processing according to the embodiment.

Referring to FIG. 4, when a user inputs a command for activating a scanner function to the operation information input/output unit 314 through the hard keys 3 or the liquid crystal touch panel 33 of the operations unit 3 (step S101), the operation information input/output unit 314 transmits a request for activating the scanner function to the print controller 214 of the main unit 2 (step S102). In response to the request, the print controller 214 activates the scanner function (step S103).

The operation information input/output unit 314 of the operations unit 3 determines that the main unit 2 is to use the external storage unit 34 (step S104) because the scanner function is activated. In other words, when the scanner function reads an original document, the main unit 2 creates image data based on the read data. In order to store the image data in the external storage device 34, the external device 34 may be connected to the main unit 2.

The operation information input/output unit 314 commands the external storage device switching unit 316 to establish connection between the external storage device 34 and the main unit 2 (step S105). In response to this, the external storage device switching unit 316 establishes the connection between the external storage device 34 and the main unit 2 (step S106).

Subsequently, when the user inputs a command for storing image data (which is to be created by reading an original document) in the external storage device 34 to the operation information input/output unit 314 through the hard keys 32 or the liquid crystal touch panel 33 of the operations unit 3 (step S107), the operation information input/output unit 314 commands the print controller 214 of the main unit 2 to read the original document, and to store the image data in the external storage device 34 (step S108). In response to this, the print controller 214 reads the original document by using the scanner function (step S109). Then, the print controller 214 transmits the read image data to the external storage device controller 315 of the operations unit 3 (step S110). The external storage device controller 315 stores the image data in the external storage device 34 (step S111).

Next, when the user inputs a command for activating an image viewing application to the operation information input/output unit 314 through the hard keys 32 or the liquid crystal touch panel 33 of the operations unit 3 (step S112), the operation information input/output unit 314 commands the image viewing application 317 to be activated (step S113). In response to this, the image viewing application 317 is activated (step S114).

The operation information input/output unit 314 determines that the operations unit 3 is to use the external storage device 34 (step S115) because the image viewing application 317 is activated. Namely, the image viewing application 317 is to be executed on the operations unit 3. In order to access the external storage device 34 that stored the read image data, the external storage device 34 can be connected to the operations unit 3.

The operation information input/output unit 314 commands the external storage device switching unit 316 to establish connection between the external storage device 34 and the operations unit 3 (step S116). In response to this, the external storage device switching unit 316 establishes the connection between the external storage device 34 and the operations unit 3 (step S117).

Subsequently, when the user inputs a command for viewing the image data stored in the external storage device 34 to the operation information input/output unit 314 through the hard keys 32 or the liquid crystal touch panel 33 of the operations unit (step S118), the operation information input/output unit 314 commands the application 317 to read the image data stored in the external storage device 34 (step S119).

The application 317 retrieves the image data stored in the external storage device 34 through the external storage device controller 315 (steps S120 and S121). Then, the application 317 processes the image data to create a preview screen. The application 317 transmits image data of the preview screen to the operation information input/output unit 314 (step S122). The operation information input/output unit 314 displays the preview screen to the user, based on the received image data (step S123).

In the above-described example, after the user activates the function of the main unit 2 or the application of the operations unit 3 (cf. steps S101 and S112), the device that is to use the external storage device 34 is determined (cf. steps S104 and S115), and the connection to the external storage device 34 is established (cf. steps S106 and S117). In this case, information may be displayed to the user to indicate that the device that is to use the external storage device 34 is automatically switched. Alternatively or additionally, the user may be queried as to whether to switch the device that is to use the external storage device 34, and a determination may be made as to whether to switch the device, based on a command of the user.

FIG. 5 is a sequence diagram showing another example of the processing according to the embodiment. In this example, during use of the external storage device 34, the device that is to use the external storage device 34 is not to be switched. Upon completing use of the external storage device 34, the device that is to use the external storage device 34 is switched.

Referring to FIG. 5, when a user inputs a command for activating a scanner function to the operation information input/output unit 314 through the hard keys 32 or the liquid crystal touch panel 33 of the operations unit 3 (step S201), the operation information input/output unit 314 transmits a request for activating the scanner function to the print controller 214 of the main unit 2 (step S202). In response to the request, the print controller 214 activates the scanner function (step S203).

The operation information input/output unit 314 of the operations unit 3 determines that the main unit 2 is to use the external storage unit 34 (step S204) because the scanner function is activated. In other words, when the scanner function reads an original document, the main unit 2 creates image data based on the read data. In order to store the image data in the external storage device 34, the external storage device 34 can be connected to the main unit 2.

The operation information input/output unit 314 commands the external storage device switching unit 316 to establish connection between the external storage device 34 and the main unit 2 (step S205). In response to this, the external storage device switching unit 316 establishes the connection between the external storage device 34 and the main unit 2 (step S206).

Subsequently, when the user inputs a command for storing image data (which is to be created by reading an original document) in the external storage device 34 to the operation information input/output unit 314 through the hard keys 32 or the liquid crystal touch panel 33 of the operations unit 3 (step S207), the operation information input/output unit 314 commands the print controller 214 of the main unit 2 to read the original document, and to store the image data in the external storage device 34 (step S208). In response to this, the print controller 214 reads the original document by using the scanner function (step S209). Here, it is assumed that it takes some time to read the original document.

In parallel to this, when the user inputs a command for activating an image viewing application to the operation information input/output unit 314 through the hard keys 32 or the liquid crystal touch panel 33 of the operations unit 3 (step S210), the operation information input/output unit 314 commands the image viewing application 317 to be activated (step S211). In response to this, the image viewing application 317 is activated (step S212).

The operation information input/output unit 314 determines that the operations unit 3 is to use the external storage device 34 because the image viewing application is activated. However, at this moment, the operation to store the read image data in the external storage device 34 is still continuing, and the external storage device 34 is used. Accordingly, the operation information input/output unit 314 waits to switch the connection (step S213).

Upon completion of reading the image by the print controller 214 of the main unit 2 (step S209), the print controller 214 transmits the read image data to the external storage device controller 315 of the operations unit 3 (step S214). Then, the external storage device controller 315 stores the image data in the external storage device 34 (step S215). Upon completion of storing of the image data in the external storage device 34, the print controller 214 reports to the operation information input/output unit 314 of the operations unit 3 that the storing is completed (step S216).

In response to this, the operation information input/output unit 314 stops waiting to switch the connection. The operation information input/output unit 314 commands the external storage device switching unit 316 to switch the connection from the connection between the external storage device 34 and the main unit 2 to the connection between the external storage device 34 and the operations unit 3 (step S217). In response to this, the external storage device switching unit 316 switches the connection from the connection between the external storage device 34 and the main unit 2 to the connection between the external storage device 34 and the operations unit 3 (step S218).

Subsequently, when the user inputs a command for viewing the image data stored in the external storage device 34 to the operation information input/output unit 314 through the hard keys 32 or the liquid crystal touch panel 33 of the operations unit (step S219), the operation information input/output unit 314 commands the image viewing application 317 to read the image data stored in the external storage device 34 (step S220).

The image viewing application 317 retrieves the image data stored in the external storage device 34 through the external storage device controller 315 (steps S221 and S222). Then, the image viewing application 317 processes the image data to create a preview screen. The image viewing application 317 transmits image data of the preview screen to the operation information input/output unit 314 (step S223). The operation information input/output unit 314 displays the preview screen to the user, based on the received image data (step S224).

Here, in order to enhance convenience, information may be displayed to the user to indicate a state of the switching of the external storage device 34. For example, information may be displayed to the user to indicate that switching is interrupted because the external storage device 34 is currently used. Additionally, information may be displayed to the user to indicate that storing of the image data in the external storage device 34 is completed, that the connection is switched, and that the connection is established between the external storage device 34 and the device that is to user the external storage device 34. Alternatively or additionally, even if the external storage device 34 is currently used, the user may be queried as to whether use of the external storage device 34 is to be interrupted, and the device that is to use the external storage device 34 is to be switched immediately. Then, a determination may be made as to whether the device is to be switched, based on a command of the user.

As described above, according to the embodiment, when a device that is to use an external storage device is to be switched, a user may not be required to open a setting screen and to switch the device that is to use the external storage device. Consequently, convenience of the user can be enhanced.

Hereinabove, the control technique of the image processing apparatus is explained by the embodiment. However, the present invention is not limited to the specifically disclosed embodiment, and variations and modifications may be made without departing from the scope of the present invention.

Specific examples of numerical values are used in order to facilitate understanding of the invention. However, these numerical values are simply illustrative, and any other appropriate values may be used, except as indicated otherwise. A boundary of a functional unit or a processing unit in a functional block may not correspond to a boundary of a physical component. An operation by a plurality of functional units may be physically executed by a single component. Alternatively, an operation by a single functional unit may be physically executed by a plurality of components. For the convenience of explanation, the devices according to the embodiment of the present invention are explained by using the functional block diagrams. However, these devices may be implemented in hardware, software, or combinations thereof. The software may be prepared in any appropriate storage medium, such as a random access memory (RAM), a flash memory, a read-only memory (ROM), an EPROM, an EEPROM, a register, a hard disk drive (HDD), a removable disk, a CD-ROM, a database, a server, or the like.

The present application is based on and claims the benefit of priority of Japanese priority application No. 2013-025155 filed Feb. 13, 2013, the entire contents of which are hereby incorporated herein by reference.

What is claimed is:

1. An image processing apparatus comprising:
an operations unit configured to include an operation system and receive an input from a user, said operation unit having an external storage device installed therein;
a main unit configured to include another operation system that is independent of the operation system and operate based on a request from the operations unit;
a determination unit configured to determine which one of the operation unit or the main unit uses the external storage device of the operations unit, in accordance with one of a function of the main unit that is activated through the input from the user at the operations unit and an application of the operations unit that is activated through the input from the user at the operation unit; and
a switching unit configured to switch a connection of the external storage device by switching a device to be connected to the external storage device between the operations unit and the main unit based on the determination of the determination unit.

2. The image processing apparatus according to claim 1, further comprising:
a query unit configured to query the user whether to switch the connection of the external storage device, prior to the connection of the external storage device being switched by the switching unit.

3. The image processing apparatus according to claim 1 wherein the switching unit waits to switch the connection of the external storage device, during use of the external storage device.

4. The image processing apparatus according to claim 3, wherein, when the use of the external storage device is completed, the switching unit switches the connection of the external storage device.

5. The image processing apparatus according to claim 3, further comprising:
a notifying unit configured to report to the user that the external storage device is used.

6. An image processing system comprising:
an image processing apparatus that includes an operations unit configured to include an operation system and receive an input from a user, said operation unit having an external storage device installed therein, and a main unit configured to include another operation system that is independent of the operation system and operate based on a request from the operations unit;
a determination unit configured to determine which one of the operation unit or the main unit uses the external storage device of the operations unit, in accordance with one of a function of the main unit that is activated through the input from the user at the operations unit and an application of the operations unit that is activated through the input from the user at the operation unit; and
a switching unit configured to switch a connection of the external storage device by switching a device to be connected to the external storage device between the operations unit and the main unit based on the determination of the determination unit.

7. A non-transitory computer readable recording medium storing an image processing program, the image processing program causes a computer being a controller of an image processing apparatus including an operations unit configured to include an operation system and receive an input from a user, said operation unit having an external storage device installed therein, and a main unit configured to include another operation system that is independent of all operation system and operate based on a request from the operations unit to operate as:
a determination unit configured to determine which one of the operation unit or the main unit uses the external storage device of the operations unit in accordance with one of a function of the main unit that is activated through the input from the user at the operations unit and an application of the operations unit that is activated through the input from the user at the operation unit; and
a switching unit configured to switch a connection of the external storage device by switching a device to be connected to the external storage device between the operations unit and the main unit based on the determination of the determination unit.

8. The image processing apparatus according to claim 1, wherein when image data is scanned and stored in the external storage device and the operations unit receives an input from the user to activate an image viewing application at the operations unit thereafter, the switching unit switches the device to be connected to the external storage device from the main unit to the operations unit.

* * * * *